United States Patent

[11] 3,548,859

[72] Inventor  Richard K. Hedlund
            Mount Prospect, Ill.
[21] Appl. No. 846,133
[22] Filed    July 30, 1969
[45] Patented Dec. 22, 1970
[73] Assignee Honeywell Inc.
            Minneapolis, Minn.
            a corporation of Delaware

[54] APPARATUS FOR INSTALLING AND MOUNTING PNEUMATIC DEVICES
    9 Claims, 11 Drawing Figs.
[52] U.S. Cl. .................................................. 137/269,
                                                    285/137
[51] Int. Cl. ............................................... F16k 27/00,
                                                    F16l 33/00
[50] Field of Search .......................................... 137/269;
            285/131, 133, 137(X); 251/367, (Inquired)

[56]            References Cited
            UNITED STATES PATENTS
2,733,731  2/1956  Turak ........................... 251/367X 2,817,098  12/1957  Mustee ........................... 285/137X
3,453,007  7/1969   Roland ........................... 285/137
3,503,414  3/1970   Schnellmann .................. 137/269

Primary Examiner—Laverne D. Geiger
Assistant Examiner—Robert J. Miller
Attorneys—Lamont B. Koontz and Francis A. Sirr ABSTRACT: Apparatus for use in the mounting and installation of pneumatic thermostats which includes a conventional pneumatic junction box and a novel protector that temporarily fits over the junction box during plastering or the like. Separate pneumatic conduits forming the supply and signal pressure lines of a pneumatic system pass through a bushing in the junction box and initially plug into a common pressure chamber in the protector, enabling all pressure lines in the system to be tested for leakage simultaneously. Upon removal of the protector the supply and signal pressure lines are plugged into the pneumatic thermostat, which is then mounted to the junction box.

PATENTED DEC 22 1970 3,548,859
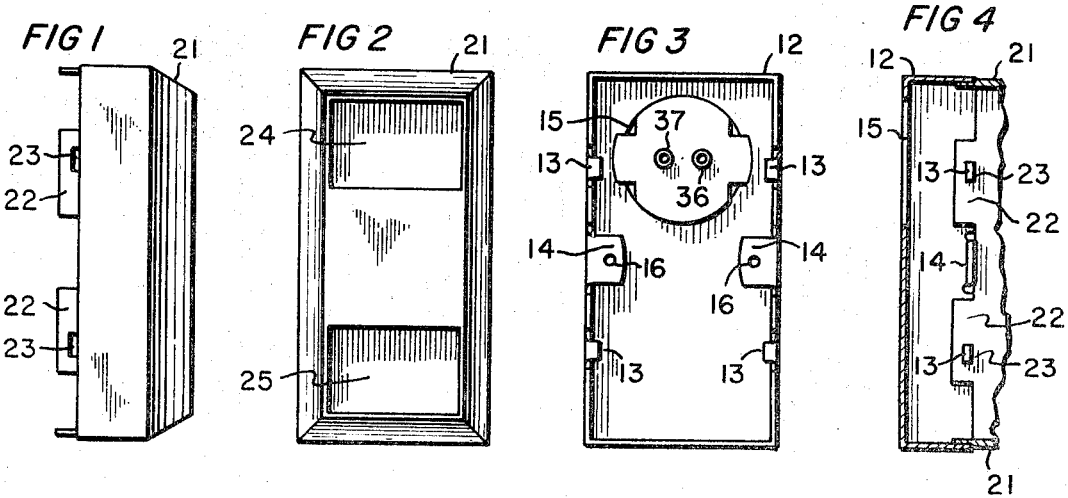
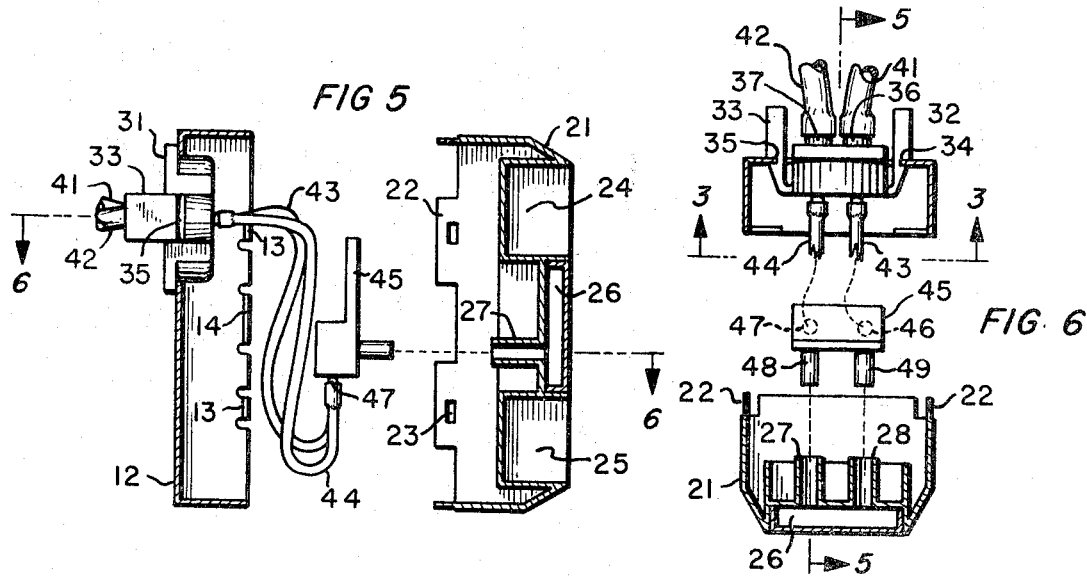
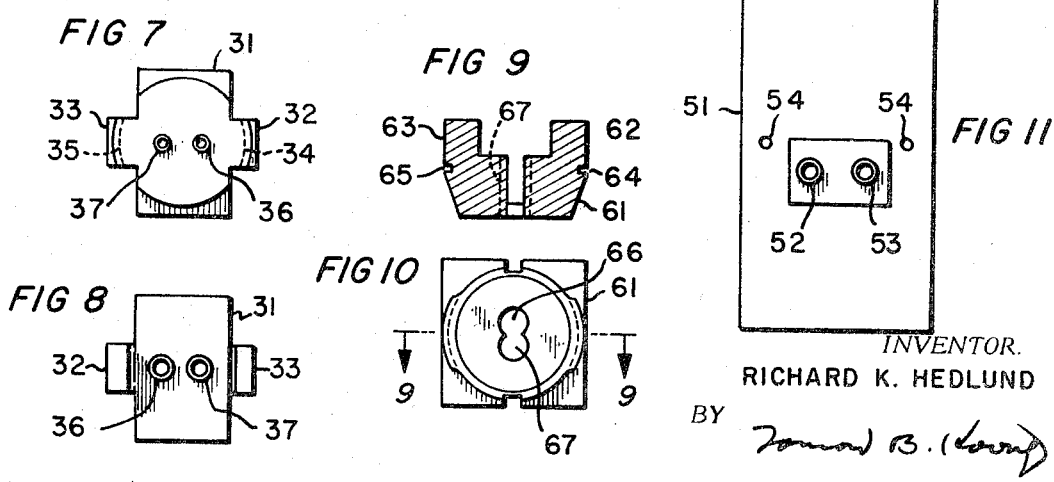
INVENTOR.
RICHARD K. HEDLUND
BY
ATTORNEY

APPARATUS FOR INSTALLING AND MOUNTING PNEUMATIC DEVICES

The invention disclosed is intended for use in the installation and mounting of pneumatic devices. Such installation practices usually require the attachment of a pneumatic junction box by appropriate means to the inner structure of a wall. Connected to the junction box from within the wall are supply and signal pressure lines which are ultimately connected to the pneumatic device itself.

During plastering or similar construction procedures, it is desirable to protect the junction box and at the same time mark the position of the junction box on the wall. Many devices are presently available that provide these functions. A box protector device embodying the subject invention, however, differs in that (a) it is also temporarily connected with the supply and signal pressure lines; and (b) it is formed wit a common pressure chamber that temporarily interconnects the supply and signal pressure lines. This enables all supply and signal pressure lines in the pneumatic system to be tested for leakage simultaneously simply by application of a single testing pressure to any point in the system.

Upon completion of the plastering the junction box is located by means of the box protector. The protector is removed and disconnected from the supply and signal pressure lines, and is replaced by the pneumatic device which is connected to the pressure lines before being mounted to the junction box.

BRIEF DESCRIPTION OF THE DRAWINGS

FIG. 1 is a side view of a pneumatic junction box protector.
FIG. 2 is a front view of the junction box protector.
FIG. 3 is a front view of a pneumatic junction box including a coupler bushing. FIG. 4 is a side view of the protector temporarily connected to the pneumatic junction box.
FIG. 5 is a side view of the pneumatic junction box and protector prior to connection, further showing the (pressure) connection from supply and signal pressure lines through a coupling bushing to the protector.
FIG. 6 is a top view of the apparatus shown in FIG. 5.
FIGS. 7 and 8 are the front and rear views, respectively, of the coupling bushing shown in FIGS. 3, 5 and 6.
FIGS. 9 and 10 are top and front views, respectively, of an alternative coupling bushing.
FIG. 11 is a rear view of a pneumatic device that is to be permanently mounted to the pneumatic junction box.

DESCRIPTION OF THE PREFERRED EMBODIMENT

FIG. 3 discloses a pneumatic junction box or support means 12 that serves to receive pneumatic pressure lines and support a pneumatic device to be connected to the pressure lines. The junction box 12 is ordinarily attached to the inner structure of a wall by means not shown. Pneumatic junction box 12 is made to conform to the shape of the pneumatic device that it supports (rectangular in this case), and is open at the front to receive the pneumatic device and its connections. Formed on the sides of the pneumatic device junction box 12 are tabs 13 which are used in the temporary connection of a protector for junction box 12, and two large tabs 14 with holes 16 that are used in the connection of a pneumatic device to junction box 12. Junction box 12 is also shown in FIGS. 4, 5 and 6.

FIGS. 1, 2, 4, 5 and 6 disclose a protector or cover means 21 which temporarily fits over junction box 12 during plastering or other such construction procedures. Junction box protector 21 is preferably molded of a suitable material and generally takes the rectangular form of junction box 12. Protector 21 includes extended tabs 22 each of which has a slot 23 that mates with one of the small tabs 13 of junction box 12. The flexible sides of protector 21 can be pressed inwardly to allow the slots 23 to fit over the small tabs 13, and when protector 21 is properly placed, its resiliency causes an outward force that keeps the slots 23 ad tabs 13 in engagement. FIG. 4 shows protector 21 and junction box 12 in proper engagement.

Protector 21 further includes recessed portions 24, 25, as best seen in FIGS. 2 and 5. As shown in FIGS. 5 and 6, a closed pressure chamber 26 is formed in protector 21, the purpose of which will be explained below. Communicating with chamber 26 are ports 27 and 28.

In the rear wall of junction box 12 is formed a circular hole 15 (FIG. 3) that receives a coupling means or bushing 31 which is shown in greater detail in FIGS. 5, 6, 7 and 8. Coupling bushing 31 not only provides a convenient connection between the concealed pneumatic line within the plastered wall (41 and 42, FIG. 6) and other lines but also preferably provides a strain relieved connection for such lines.

Coupler bushing 31 may have two winged portions 32, 33 in which are formed grooves 34, 35 respectively. Bushing 31 is preferably made of a resilient material so that upon insertion into hole 15, the winged portions 32 and 33 can be forced inwardly until the grooves 34, 35 engage the rear wall of junction box 12. The resiliency of coupling bushing 31 then holds it in engagement with junction box 12.

Firmly secured in coupling bushing 31 are a pair of tubes 36, 37 (see FIG. 6), both of which pass completely through bushing 31. Tubes 36 and 37 each normally has an enlarged end and a narrowed end as shown.

The enlarged portions of tubes 36, 37 are adapted for connection with a supply pressure line 41 and a signal pressure line 42 as shown in FIGS. 5 and 6. The pressure connection is continued on the inside of junction box 12 by means of flexible conduits 43, 44 which are fitted over the narrowed portions of tubes 36, 37. Conduits 43, 44 are connected with ports 27, 28 of pressure chamber 26 by means of a pressure connector 45 as shown in FIGS. 5 and 6. As these figures show, connector 45 has a first pair of integrally formed tubes 46, 47 that receive conduits 43, 44, respectively, and a second pair of integrally formed tubes 48, 49 that mate with ports 27, 28 of pressure chamber 26. A friction fit enables pressure tight connection when tubes 48, 49 are plugged into ports 27, 28.

FIG. 11 discloses the rear side of a pneumatic device 51 that requires a supply of regulated pressure and generates a signal pressure in accordance with changes in a variable condition. Device 51 is constructed to receive a supply of regulated pressure at port 52 and provides its signal pressure at a port 53. Ports 52 and 53 are sized and relatively spaced identically to ports 27 and 28 of protector 21 and are also capable of receiving the pressure connector 45 in the manner described above. Device 51 has a pair of holes 54 that align with holes 16 in tabs 14 of junction box 12 to enable device 51 to be mounted on junction box 12 by appropriate fastening means not shown.

Installation and mounting of pneumatic device 51 first involves attaching the junction box 12 to the internal portions of a supporting structure such as a wall, not shown. With the pressure connections from supply and signal pressure lines 41 and 42 to pressure connector 45 completed, connector 45 can be plugged into ports 27 and 28 of protector 21, which is then placed in temporary engagement with junction box 12 by means of tabs 13 and slots 23. With a plurality of such installations completed at this point, it is possible to test both the supply pressure lines and signal pressure lines simultaneously for pressure leakage by virtue of the common connection through chamber 26 of protector 21. Plastering can now take place with the junction box 12 fully shielded by protector 21.

With the plastering completed, the location of each junction box 12 is easily located by protector 21, which protrudes through the plaster. Protector 21 is removed by forcing its resilient side walls inwardly to disengage slots 23 from tabs 13. The length of conduits 43, 44 enables protector 21 to be removed from junction box 12 while still connected. Pressure connector 45 is then unplugged from protector 21 and plugged into the proper ports 52, 53 of the pneumatic device 51. Device 51 is then mounted to junction box 12 as described above.

An alternative coupling bushing 61 is disclosed in FIGS. 9 and 10. Coupler 61 also has winged portions 62, 63 with grooves 64, 65 formed therein, but through passages 66, 67 are included rather than the tubes 36 and 37 of coupling 31. Coupling bushing 61 is used where it is desirable to utilize the supply and signal pressure lines 41 and 42 themselves to establish a direct pressure connection with connector 45. Pressure lines 41 and 42 therefore perform the function provided by tubes 36, 37 and conduits 43, 44.

During the installation procedure pressure lines 41 and 42 are inserted through passages 66, 67, and with winged portions 62, 63 squeezed inwardly for insertion into hole 15. The pressure lines 41, 42 are held in position by friction fit. The resiliency of coupling bushing 61 retains pressure lines 41, 42 in this strain relief position after grooves 64, 65 have engaged the rear wall of pneumatic junction box 12. The remaining installation procedure is the same as that described above.

While the present disclosure shows two lines connected to a suitable device, it is obvious that the present apparatus may be used for a single line by plugging the unused tube 46 or 47. Further, provisions may be made for three or more lines following the teachings above if desired.

I claim:

1. Apparatus for use in the installation of pneumatic devices, comprising:
    support means;
    coupling means attachable to the support means and adapted to engage air lines for the pneumatic device;
    cover means constructed for temporary engagement with the support means and arranged to shield the support means, the cover means having a pressure chamber formed therein;
    the support means being constructed to receive the pneumatic device in the absence of the cover means; and
    conduit means for selectively establishing a pressure connection from the air lines to the pressure chamber of the cover means or to the pneumatic device.

2. The apparatus as defined by claim 1, wherein the coupling means comprises pressure connection means constructed and arranged to connect the air lines with the conduit means.

3. The apparatus as defined by claim 1, wherein:
    the air lines comprise a supply pressure line and a signal pressure line;
    the pneumatic device has a supply pressure inlet and signal pressure outlet; and
    the conduit means comprises a first conduit for selectively establishing a pressure connection from the supply pressure line to the pressure chamber or to the pneumatic device inlet, and a second conduit for establishing a pressure connection from the signal pressure line to same pressure chamber or to the pneumatic device outlet.

4. The apparatus as defined by claim 3, wherein the first and second conduits are flexible.

5. The apparatus as defined by claim 3, wherein the conduit means further comprises a pressure connector for retaining the first and second conduits in spaced relation, the pressure connector constructed to permit simultaneous connection of the first and second conduits with the pressure chamber or the pneumatic device inlet and outlet, respectively.

6. The apparatus as defined by claim 5, wherein:
    the pressure chamber has a first receiving portion and a second receiving portion; and
    the pressure connector is constructed to plug into the first and second receiving portions of the pressure chamber or the pneumatic device inlet and outlet, respectively.

7. The apparatus as defined in claim 1, wherein the support means comprises a pneumatic junction box, the conduit means being disposable within the junction box.

8. The apparatus as defined in claim 3, wherein the coupling means comprises a bushing integrally formed with first and second tubes, the first tube joining the supply pressure line and the first conduit, and the second tube joining the signal pressure line and the second conduit.

9. The apparatus as defined by claim 3, wherein:
    the first and second conduits are extensions of the supply and signal pressure lines, respectively; and
    the coupling means comprises a bushing having through passages for the supply and signal pressure lines, the bushing being constructed to frictionally hold the supply and signal pressure lines in strain relief positions.